(12) United States Patent
Gonzalez

(10) Patent No.: US 8,412,579 B2
(45) Date of Patent: Apr. 2, 2013

(54) RECIPES MANAGEMENT SYSTEM

(76) Inventor: Carlos Gonzalez, Fairfax, VA (US)

( * ) Notice: Subject to any disclaimer, the term of this patent is extended or adjusted under 35 U.S.C. 154(b) by 1091 days.

(21) Appl. No.: 12/002,498

(22) Filed: Dec. 18, 2007

(65) Prior Publication Data

US 2009/0157752 A1    Jun. 18, 2009

(51) Int. Cl.
  *G06Q 30/00*    (2012.01)
  *G06Q 50/00*    (2012.01)
(52) U.S. Cl. .......................................................... 705/15
(58) Field of Classification Search .......................... None
  See application file for complete search history.

(56) References Cited

U.S. PATENT DOCUMENTS

| | | | | |
|---|---|---|---|---|
| 6,810,343 B2 * | 10/2004 | McKee | ........................... | 702/81 |
| 7,026,916 B2 * | 4/2006 | Alexander | ............... | 340/286.09 |
| 7,093,193 B1 * | 8/2006 | Goldberg | ...................... | 715/207 |
| 7,372,361 B1 * | 5/2008 | Mealing | .................... | 340/286.09 |
| 7,624,051 B2 * | 11/2009 | Gellman | ........................... | 705/35 |
| 2002/0010637 A1 * | 1/2002 | Lieu et al. | ........................ | 705/26 |
| 2006/0184369 A1 * | 8/2006 | Levonas | ........................ | 704/275 |
| 2008/0133724 A1 * | 6/2008 | Clark | ............................. | 709/223 |

* cited by examiner

*Primary Examiner* — Paul Danneman

(57) ABSTRACT

The present invention is generally related to a system for managing recipes using a web server and an off-line software application. A user using the software application will be able to create, display, print, modify, and search recipes and menus. The web server will be a recipe store where a user can buy and download individual recipes and electronic cookbooks into the software application secure database storage. The software application has a web interface to communicate with the recipe store, allowing the user to have an extended set of facilities like posting his/her own recipes for sale, requesting restaurant and food store services for a given recipe or menu, requesting the restoration of their recipe database, and receiving suggested drinking dates for their current wine inventory. The software application comes in two versions: the read-only and the all-inclusive version. With the read-only version a user will not be able to create or modify a recipe or use any of the extended facilities. The read-only version will be free to download from the recipe store.

8 Claims, 4 Drawing Sheets

RECIPES MANAGEMENT SYSTEM

BACKGROUND OF THE INVENTION

At present time when a person wants to find a recipe they either search their printed materials (cook books, magazines, notes, Xerox copies, etc), or they go to the world wide web and use a search engine. In the first case of the printed material, unless the person is highly organized, or has a very good memory, the search could take a long time and the result may or may not be the desired recipe. When searching online, the problem usually is that there are no results or that too many answers come back, and filtering the results could be a monumental task.

Currently the creators of recipes, or the owners' of intellectual property rights of recipes can sell their recipes only in the printed media (books, magazines). In order for them to have their recipes sold electronically, they would have to have the assurance that their intellectual property rights are fully covered and protected. One of the main problems in the music industry selling their music electronically is that their property rights are not easily fully covered or protected. It is relatively easy to transfer (copy) a song from one customer to another without the intellectual property owner's knowledge.

To overcome these shortcomings of existing options for recipe users, and recipe owners, the present invention is developed to produce an effective means to facilitate the access to recipes and provide them to users in a way that satisfies their needs of easy retrieval and secure archival. It will also satisfy the needs of the intellectual property owner of the recipe by securing and protecting its contents.

SUMMARY OF THE INVENTION

The Recipe Management System is composed of five units: the Recipe Management software application unit which we will call InfoRecipes, the Recipes and Control web server unit which we will call RecipeStore, and three Processing units: a Credit Card Processing unit, a Restaurant Processing unit, and an Ingredients Processing unit InfoRecipes is an application software designed to run on a user personal computer (PC), or a Personal Digital Assistant (PDA), or any other information appliance devices that have access to the World Wide Web. InfoRecipes comes in two forms: the complete InfoRecipes application in which the user has access to all the functionality and services provided, and the InfoRecipes Reader, in which the user has available a subset of the complete functionality. For example, with InfoRecipes Reader the user will only be able to read the recipes, not modify an existent one, or create new ones. InfoRecipes will help a user manage their recipes. All the recipes that a user can see in InfoRecipes are stored in a DataBase in the user local PC. Each recipe will have as minimum the following information: Name (e.g. Apple and Manchego Salad with Marcona Almonds); Source (i.e. where can we find the complete description of the recipe) could be a magazine, a book, etc, or the user's hard disk; Sub-Source, are all the different Sources associated with the same Source (e.g. if the source is a chef, the sub-sources will be the different books of this chef) Sources don't have to have sub-sources; Specific Location, a description of where in the source the recipe is. (e.g. if the source was a magazine, the specific source could be the month, year and page number of where the recipe is described); Recipe Food Categories (e.g. Almonds, Salads, Cheese). InfoRecipes also has additional information users can save with each recipe: Serving Size (e.g. 6 servings), Nutritional Information (e.g. Low Cholesterol), Last Time Served (e.g. Thanksgiving 2004), Preparation Time (e.g. 2 hours), Recipe Overall Grade (e.g. Very Good), Comments (e.g. The gravy should be served very hot). When a user recipe is saved in the PC hard disk, InfoRecipes saves the ingredients of this recipe and the complete description of the recipe's process. InfoRecipes also saves with each recipe the following information: a web URL if the recipe is available on the web; A flag indicating if the recipe or the electronic book that has the recipe is available at the RecipeStore; A flag indicating if there is at least one restaurant available to cook this recipe; A flag indicating if there is a store available to send the user all the ingredients to cook this recipe; A flag indicating if the user has in his/her wine cellar a wine recommended for this recipe; a unique ID identifying the recipe.

An InfoRecipes user can create and manipulate menus using the recipes in his/her database.

InfoRecipes will have a service capability available to the user by reacting to voice commands. InfoRecipes will let users use their own voice to look up recipes, do searches, connect to the RecipeStore, as well as give simple InfoRecipes commands.

A user of InfoRecipes could search for recipes in his/her own PC, and use a multitude of filters to narrow the answers. Once a recipe is located, if the recipe is in the hard disk, the user can access this recipe right away. If the recipe is not in the hard disk, and the recipe is available for sale at the RecipeStore, the user may buy this recipe by clicking a button. InfoRecipes will open a web browser (the user must have a connection to the internet to use this option) and send the user to the RecipeStore web server where the user can buy this recipe and more, and also buy the electronic book if available. The RecipeStore will take care of collecting the amount of the sale, and allow the user to download his/her buys. These recently bought recipes will be loaded directly into the user InfoRecipes database, making them immediately available. The information is transferred as a database which has its fields encrypted, and is password protected. The secure communication transfer will be done using Transport Layer Security (TLS) and Secure Sockets Layer (SSL), which are cryptographic protocols that provide secure communications on the Internet for such things as web browsing. Once a user has made a purchase at RecipeStore, the information about all his/her transactions are recorded and saved. Later on may request a new download of old purchases. RecipeStore will validate the user information and the ID of the InfoRecipes application. If they both agree, the download is permitted. If the InfoRecipes ID doesn't match the user ID, the user may then be required to buy an all-inclusive InfoRecipes application license before the downloading is allowed. The RecipeStore will keep the information of this specific transaction for future use to protect against illegal downloads. InfoRecipes will also provide users the service of having an automatic backup (located at the RecipeStore server) of all his/her recipes saved on the hard disk. Even though the RecipeStore saves the information on all the recipes bought at the RecipeStore, this extra service will include all the recipes created by the user directly and therefore not in the RecipeStore.

If a user of InfoRecipes is the intellectual property owner of a recipe, they can use InfoRecipes to connect to the RecipeStore and post their recipes at the RecipeStore for sale. RecipeStore will help and guide an owner in this process. RecipeStore will periodically monitor the contents of the recipes and may remove any that violates the rules set forth by RecipeStore for posting recipes/electronic books on its web site. RecipeStore will keep track of all sales, and periodically pay recipe owners their royalties.

The RecipeStore web server will have two types of users: users that access the server via InfoRecipes, or users that arrive directly to the server. For the latter ones, RecipeStore will notify the user that in order for them to do any shopping they have to do it through InfoRecipes. RecipeStore will allow any user to download free of charge an InfoRecipe Reader application, or buy the all-inclusive InfoRecipes. RecipeStore will help and guide the user to do the downloading and installation of the InfoRecipes in the user PC. RecipeStore will save the user information and InfoRecipes ID of each download. Once the user is in the RecipeStore via InfoRecipes, the user can do several things: browse the store for recipes and electronic books, select a set of recipes to buy, register as a recipe owner, or login as a recipe owner. When a user finishes his/her selections and is ready to checkout, RecipeStore will gather for the user the amount of sale, and communicate with the Credit Card Processing server to approve the sale. If the sale is approved, the RecipeStore creates a database with the user's purchases and transmits this database to the user PC via InfoRecipes. When InfoRecipes is notified that a download is completed, it proceeds to move the information from the downloaded database into the user operational database. Once this step is done the user is notified that his/her new recipes are ready to be manipulated.

When a recipe owner comes to RecipeStore via InfoRecipes, then if the owner has not registered as such, he/she will be required to do so. Part of the registration will be to accept the set of rules for posting recipes in RecipeStore. Once the owner is registered, they can download as many of his/her recipes into RecipeStore as wanted. This process is done by InfoRecipes preparing and sending a database to the RecipeStore with the information. RecipeStore will check the database and proceed to add the recipes sent into the RecipeStore operational database where they become immediately available for sale to the public.

A restaurant will be able to participate in the Recipe Management System in three ways: first, if they want to sell their recipes to the public, they can put them on sale in the RecipeStore. Second, if they are willing to make the recipes or menus and deliver it to customers (the restaurant will be able to define the conditions for delivery like maximum distance, minimum time, etc.), they can set this up in the RecipeStore. And third, if the restaurant is willing to accept reservations when a customer wants to have a recipe or menu prepared at the restaurant at a certain time and date, the restaurant can have this option set up in their recipes. If a restaurant is willing to either make and deliver their recipes or menus, or accept reservations for having their recipes or menus served at their restaurant, they will become part of the Restaurant Processing unit where they will be able to receive, process and answer requests of services via the user using InfoRecipes. A restaurant can also make use of the InfoRecipes software for: managing their own recipes and menus, and managing their wine cellars with the Wine Cellar package available in InfoRecipes. This Wine Cellar package will keep track of the wine bottles available on the user wine cellar. Also, there will be a service available in which InfoRecipes will communicate with the Wine Manager at the RecipeStore server, and will get an update on the status of the user's wine bottles (e.g. this wine is ready to drink, this wine has only one more year of good life, etc). This wine information is very useful for users, especially for restaurants, who want to avoid presenting customers with bad wines, or when restaurants want to promote wines that may expire soon.

A supermarket or any other food store that is willing to receive requests for the ingredients of a recipe or menu and deliver them to a customer, can be part of the Ingredients Processing unit. The store will set up their conditions (like maximum distance, minimum charge, etc.) A store that participates in the Ingredients Processing unit will be able to receive, process and answer requests of services. A user that wants to have the ingredients for a recipe or menu delivered to their location will use InfoRecipes to request this service. InfoRecipes will contact the Restaurant and Ingredients Manager of the RecipeStore, which will check first if the request is valid (e.g. the user is in good standing, there is a store close enough to the user, etc.). If the request is valid, RecipeStore will send the request to the Ingredients Processing unit, which may or may not grant the request. If the request is granted, RecipeStore notifies the user via InfoRecipes, and requests user confirmation and any payments required. Only once the order is confirmed and paid, will the user be notified.

BRIEF DESCRIPTION OF THE DRAWINGS

Other objects and advantages of the invention will become more apparent from the specification taken in conjunction with the accompanying drawings, in which.

DETAILED DESCRIPTION OF THE INVENTION

Figure 1:
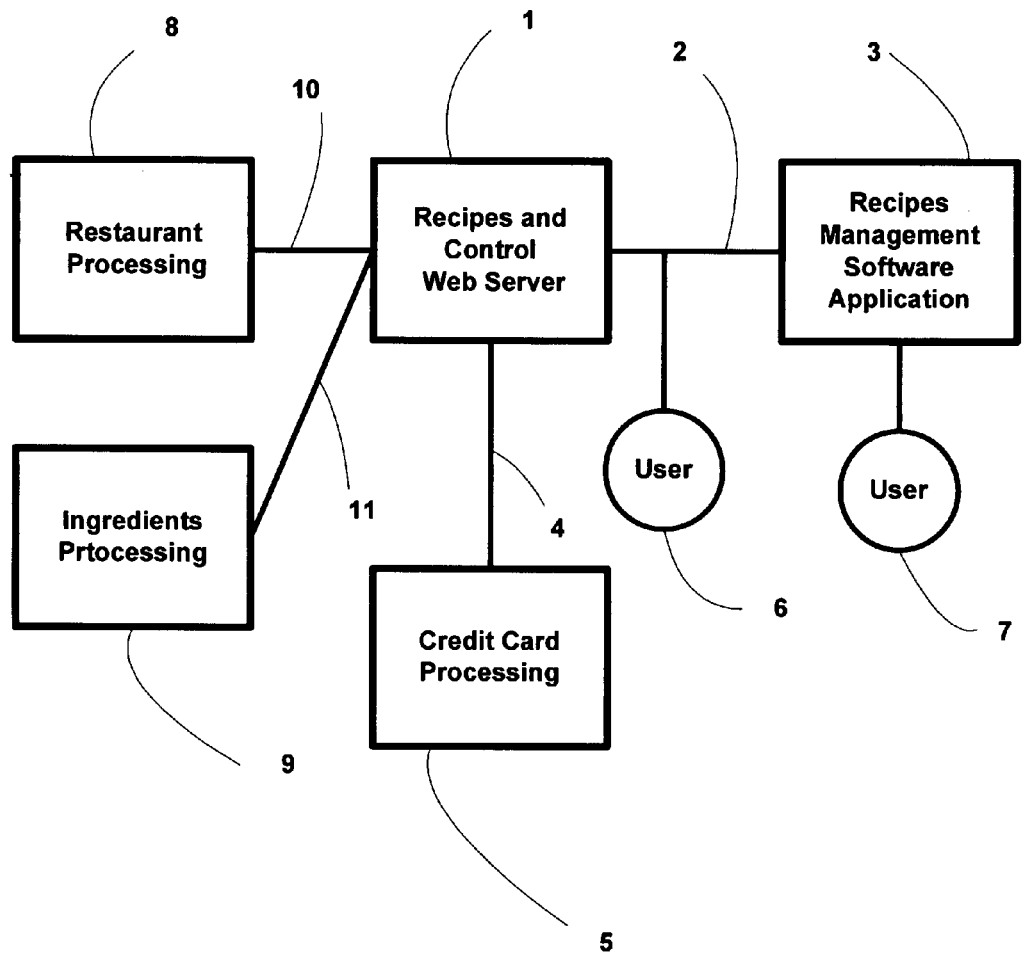
FIG. 1. is a high level system diagram of the invention
Figure 2:
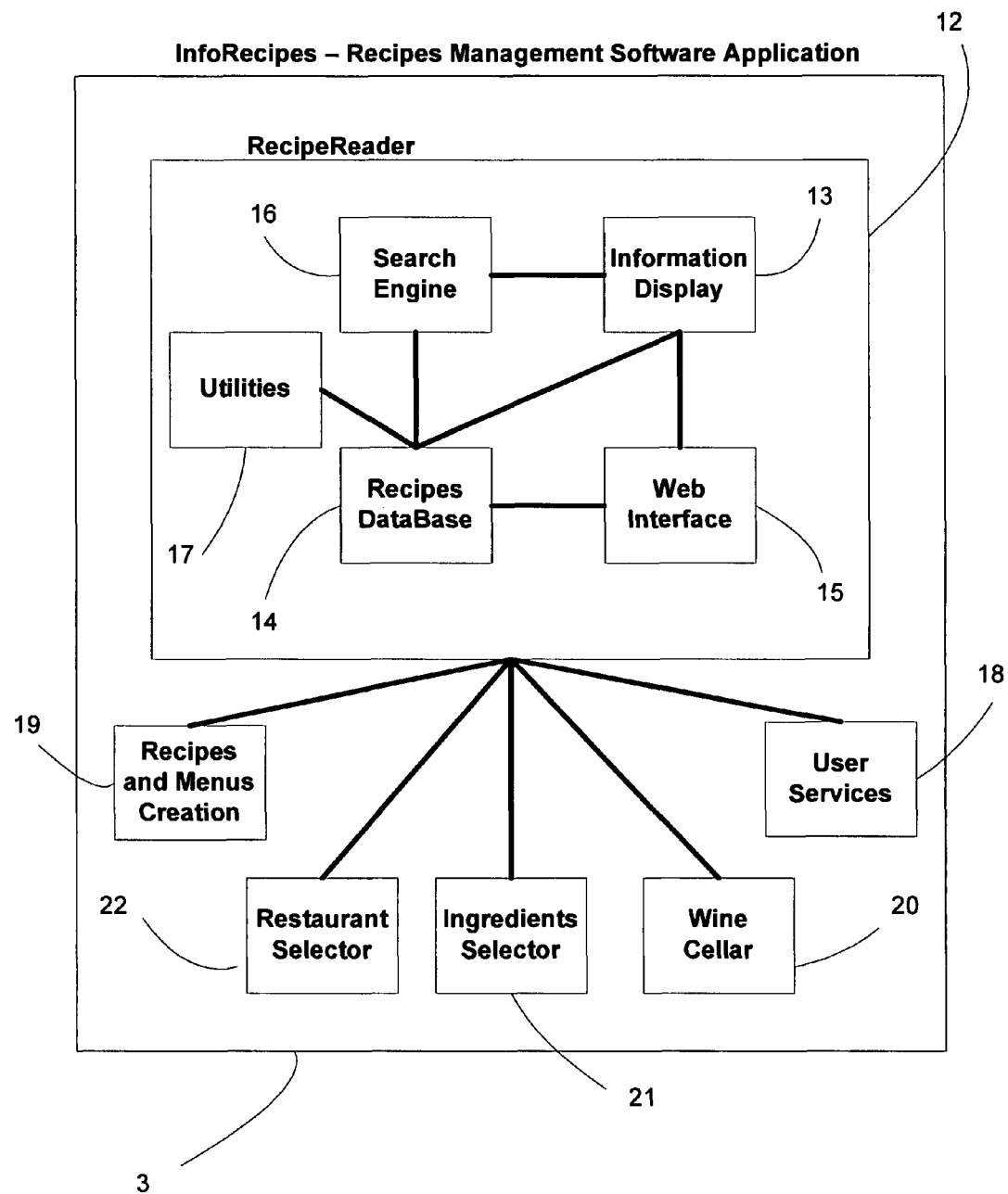
FIG. 2. is a high level system diagram of the Recipes Management Software Application FIG. 3. is a high level system diagram of the Recipes and Control Web Server FIG. 4. is a high level system diagram of the Web Server and Recipe Store
Figure 3:
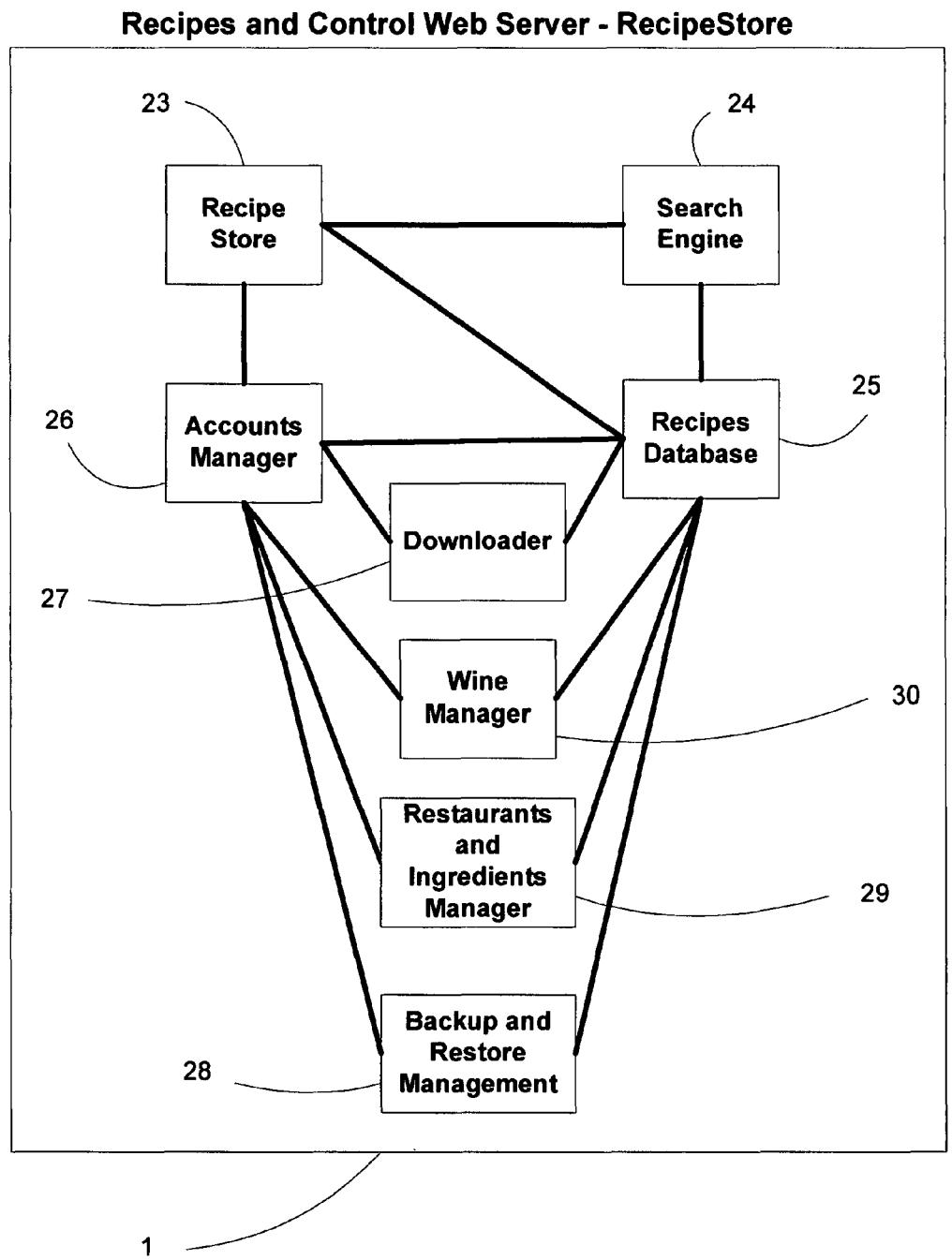
Figure 4:
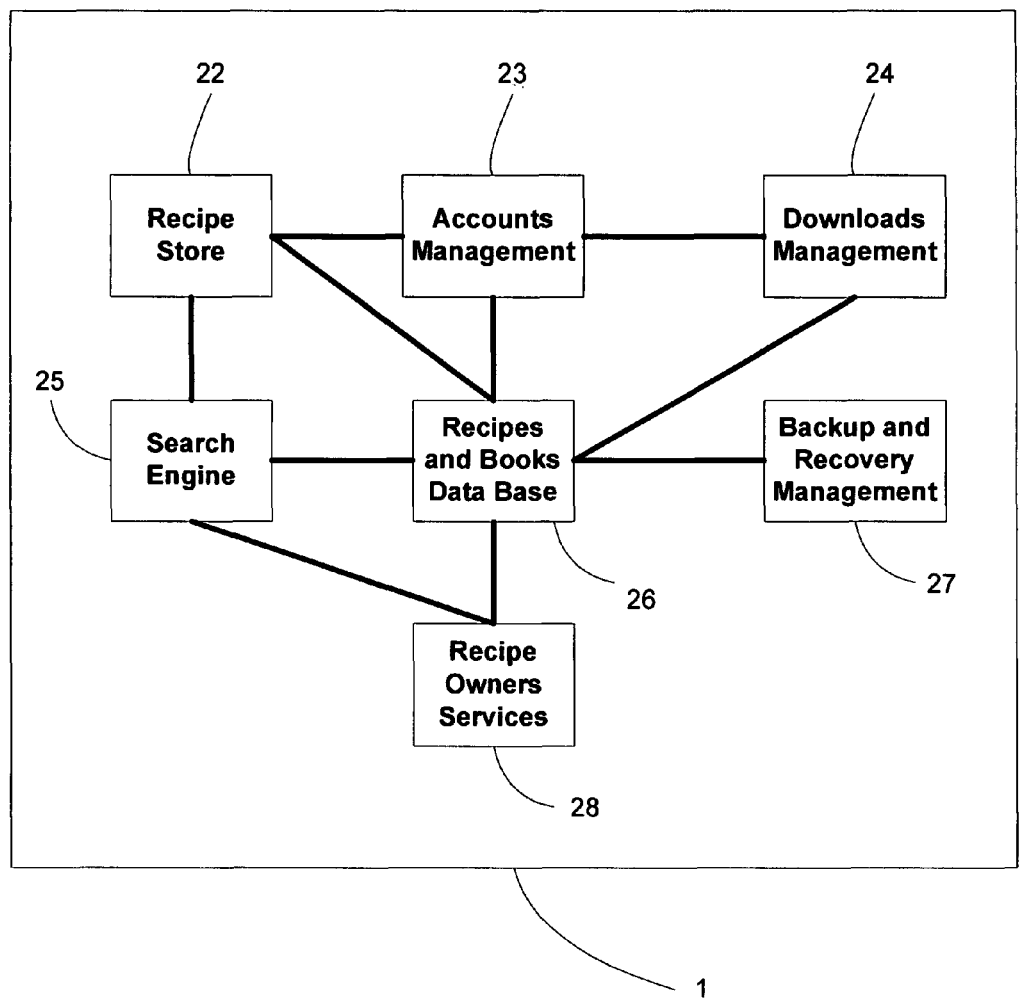

The Recipes Management System depicted in FIG. 1. is comprised of: a Recipes and Control Web Server Unit 1, a Recipes Management Software Application Unit 3, a Credit Card Processing Unit 5, a Restaurant Processing Unit 8, and an Ingredients Processing Unit 9. The Recipes and Control Web Server and the Recipes Management Software Application communicate with each other through the World Wide Web 2. The Recipes and Control Web Server 1 communicates with the Processing units Credit Card 5, Restaurant 8 and Ingredients 9 via the World Wide Web or another secure communication line 4, 10 and 11. A user of this system 6 communicates with the Recipes Management Software Application through the World Wide Web 2. The most common way of using the system by a user 7 is by using the Recipes Management Software Application 3. The application software running on the Recipes Management Software Application 3 is called InfoRecipes and it is an application software designed to run on a user personal computer (PC), or a Personal Digital Assistant (PDA), or any other information appliance device that have access to the World Wide Web. The Recipes and Control Web Server 1 will be called the RecipeStore.

When a user 7 wants to look for a recipe, it will start the InfoRecipes 3. Inside Inforecipes the user will be able to search for the desired recipe(s) using the Search Engine unit 16. The Search Engine 16 will access the Recipes Database unit 14 and display the search results information using the Information Display 13 unit. If the desired recipe is in his/her local hard disk, the description and process of the recipe is available to the user to display or print. If the desired recipe is not available in the local PC, InfoRecipes will notify the user if the recipe is available in a web site, or if the recipe is available in the RecipeStore. The user can now use the Web Interface unit 15 to either go to the web site where the recipe is located, or go to the RecipeStore to browse and possibly buy this recipe. In order for the user to use the Web Interface functionalities, the user must have access to the Internet. The Utilities unit 17 provides the user with additional functionality like a comprehensible user help system, and a conversion system to support the user with cooking conversions. The functionality provided by these five units (Search Engine, Recipes Database, Information Display, Web Interface, and Utilities) make the functionality available to the RecipeReader Software 12.

When a user using the RecipeReader of InfoRecipes clicks on a button to go to the RecipeStore, the Recipe Store unit 23 will display for the user all the possible available commands like (add to shopping cart, search, display, process order, download software, and exit). If on the other hand the user using InfoRecipes has the all-inclusive software version, and they click on the button to go to the RecipeStore, the user has all the commands available to the RecipeReader user, plus additional user commands. Commands like: Add a Recipe to the RecipeStore, request the use of the Restaurant or Ingredients units 29 for both users and providers of services, use of the Wine Manager unit 30, or request the use of the Backup and Restore Management unit 28.

A user 6 accessing the RecipeStore 1 directly without going through InfoRecipes will be notified that the use of RecipeStore must be through the use of InfoRecipes, and that a free RecipeReader or the all-inclusive InfoRecipes are available for downloading. If the user selects to download the RecipeReader, this information is passed to the Downloader unit 27. The Downloader will prepare the information package which will have the RecipeReader software, the local Recipe DataBase (including ID and security information), and the installation software. The Downloader will guide the user in downloading the package to the user PC, and installing it. If the user selects to download the all-inclusive InfoRecipes, the Accounts Manager unit 26 is engaged, and the user information (name, address, e-mail and credit card information) is collected. The Accounts Manager calculates the final cost of the user order, and passes this information to the Credit Card Processing unit 5 through a secure line 4. The Credit Card Processing unit will approve or disapprove the charge to the user credit card. If the charge is not approved, the user is notified, and denied the downloading. Upon approval of the credit card charges, the Credit Card Processing unit proceeds to debit the user credit card, and generate a credit into the RecipeStore bank. Once the credit card charge is approved, then the Accounts Manager notifies the Downloader 27 and the Recipes Database 25 to proceed with the downloading, which will be done in much the same way as with the RecipeReader software.

When a user 7 is searching in the RecipeStore for a recipe or set of recipes he/she uses the Search Engine unit 24 and the Recipes Database 25. The RecipeStore will display the results of the search with all available recipes, electronic books, videos, audio and paper books that matches the requested search. The user proceeds to select all the desired articles and adds them into their shopping cart. Once the user is done selecting, he/she will confirm their order and continue onto the Accounts Manager to provide his/her personal and credit card information. The Accounts Manager will continue as described above. After the Downloader finishes downloading the user purchases, the information about the purchase and the user ID will be saved by the Backup and Restore Management unit 28. Later on if a user looses their RecipeStore buys, he/she can request from the RecipeStore to restore those buys.

The all-inclusive InfoRecipes will allow the user to create/modify/delete their own recipes which will be saved in the user's hard disk. The user will also be able to create/modify/delete menus. An additional functionality available to the all-inclusive user, will be the creation of food categories (i.e. keywords used for searching), and the creation of nutritional types. Other options available to the user of the all-inclusive InfoRecipes are the Restaurant Selector 22 and the Ingredients Selector 21. With the Restaurant Selector, the user will be able to request from a restaurant to either have the recipe or menu cooked and delivered or cooked at the restaurant. Each recipe in the system has a flag indicating if this option is available for this recipe. If a restaurant wants to offer this option through InfoRecipes, the restaurant, by way of the User Service unit 18 will log in as a provider of such services. Then the Web Services unit will connect to the RecipeStore where the restaurant information will be saved into the server's Recipe Database, and a link to the Restaurant Processing unit 8 is created for this restaurant. When a user requests through InfoRecipes a restaurant request. Inforecipes will connect to the RecipeStore (via the Web Interface 15). RecipeStore will send this request to the Restaurants and Ingredients Manager unit 29. The Restaurants and Ingredients Manager unit will first check the Recipes Database 25 to see if this recipe has these options. If the request is valid, then the RecipeStore will communicate with the Restaurant Processing unit 8 (via a secure communication line 10) to ask if the request can be granted or not. If the request is not granted, the information will go back and the user will be notified. If the request is granted, the information is passed along to the user (via the RecipeStore Restaurant and Ingredients Manager and InfoRecipes Web Interface). The restaurant may answer giving the user multiple options from which to select. If the user then accepts one of the suggested options (i.e. time of delivery, total cost, and amount of down payment), RecipeStore receives the user approval and pass this information along to the Restaurant Processing unit. If there is a down payment required, this will be taken care of by the Restaurant Processing unit. RecipeStore will save the user and restaurant information in its database, and proceed to charge the restaurant for RecipeStore's commission. The user is notified when his/her request is granted and the amount charged to their credit card.

The Ingredients Selector works similar to the Restaurant Selector, but the service provider in this case is a food store. When a user wants to have the ingredients of a recipe or menu either delivered or have them ready at the store, InfoRecipes will process this request (via the Ingredients Selector 21 and Web Interface 15, the RecipeStore Restaurants and Ingredients Manager 29, and the Ingredients Processing unit 9). The user will be presented with several options and if one is selected, RecipeStore and the food store will be notified, and the information, payments and commission processed.

A user of the all-inclusive InfoRecipes will have the option of buying the Wine Cellar 20 functionality for their system. The Wine Cellar has a basic functionality that allows the user to manage their wine cellars and use this information in their recipes and menus. The Wine Cellar advanced services functionality will update the status (e.g. ready to drink, should mature in one more year, etc.) of the user's current wines. To have the Wine Cellar advanced services functionality the user needs to have the basic functionality. The InfoRecipes software of a user with the Wine Cellar advanced services functionality will contact the Wine Manager 30 in the RecipeStore for an update on the status of the user's current wines every time the user logs into the software.

As stated above, every buy a user makes through RecipeStore is saved. If a user looses his/her recipes, RecipeStore through the Backup and Restore Management unit 28, will restore the user recipes. This service will not restore any of the user's own created recipes. The all-inclusive InfoRecipes has the option for the user to have all his/her recipes and menus backed-up by the RecipeStore (using the Backup and Restore Management unit 28). As with the advanced Wine Cellar option, the user InfoRecipes will contact the Backup and Restore Management unit 28 in the RecipeStore for an update on the new/modified user recipes and/or menus every time the user logs into the software.

The disclosure of the invention described herein-above represents the preferred embodiment of the invention; however, variations thereof, in the form, construction, and arrangement of the component thereof and the modified application of the invention are possible without departing from the spirit and scope of the appended claim.

I claim:

1. A computer method and software modules for managing food recipes comprised of: a Recipes and Control Web Server with services for customers to buy food recipes and sell their own created food recipes, and services for customers to buy and sell products related to food recipes; a Recipes Management Software Application for customers to manage their food recipes locally in their own computer devices; the means of said Recipes and Control Web Server to securely communicate with said Recipes Management Software Application; wherein said customers of said Recipes and Control Web Server have access to services provided by said Recipes and Control Web Server only through said Recipes Management Software Application; wherein said customer's own created food recipes are created only through said Recipes Management Software Application; wherein all recipes handled by the Recipes and Control Web Server and the Recipes Management Software Application are comprised of: a description name for the recipe, a set of edible food ingredients and their measurements, a process for creating the food recipe, an optional list of food categories for indexing the food recipe, an optional set of nutritional values of the food recipe, an optional serving size, an optional estimated preparation time, an optional food recipe overall grade, and an optional set of comments; wherein recipes bought by said customer's at the said Recipes and Control Web Server are then downloaded and integrated into the database of the customer's said Recipe Management Software Application and can be changed by said customer modifying any or and all information and data of said recipe to create a new recipe or update the original recipe with new information and or data.

2. The computer method and software modules of claim 1 wherein said Recipes and Control Web Server includes, a Credit Card Processing unit to process securely electronic commerce transactions, a food recipe related search engine, a secure database for storing food recipe related information, a facility for maintaining customer purchasing history, a facility for downloading and uploading software and data, and a backup and recovery facility for databases.

3. The computer method and software modules 1 wherein said Recipes Management Software Application includes, a secure database for storing food recipes and food recipes related information, a web interface to securely communicate with said Recipes and Control Web Server, a food recipe related search engine, a facility to create, modify, and delete food recipes and related information, a facility to display and print food recipes and related information, a facility to backup and restore databases with food recipes and related information, interfaces for adding functions to extend the functionality of the software, and a facility to securely set up for commerce customers at said Recipes and Control Web Server.

4. The computer method and software modules of claim 3 wherein said Recipes Management Software Application is limited to download, search, display, and print food recipes.

5. The computer method and software modules of claim 4 wherein: said Recipes Management Software Application can be downloaded without a fee by anybody from said Recipes and Control Web Server.

6. The computer method and software modules of claim 3 wherein: said Recipes Management Software Application can be purchased and downloaded by anybody from said Recipes and Control Web Server.

7. A computer method and software modules for customers to manage their food recipes locally in their own computer devices comprised of: using a computer device secure database for storing food recipes and food recipes related information, communicating securely with food recipe related web servers over the Internet, a food recipe related search engine, a facility to create, modify, and delete food recipes and related information, a facility to display and print food recipes and related information, a facility to backup and restore databases with food recipes and related information, interfaces for adding functions to extend the functionality of the software, and a facility to securely set up for commerce customers to buy food recipes at said food recipe related web servers, and set up for commerce customers to sell their own created food recipes at said food recipe related web servers, where said customer's own food recipes are comprised of: a description name for the recipe, a set of edible food ingredients and their measurements, a process for creating the food recipe, an optional list of food categories for indexing the food recipe, an optional set of nutritional values of the food recipe, an optional serving size, an optional estimated preparation time, an optional food recipe overall grade, and an optional set of comments; wherein recipes bought by said customer's at the said food recipe related web servers are then downloaded and integrated into the database of the customer's said recipe management software application and can be changed by said customer modifying any or and all information and data of said recipe to create a new recipe or update the original recipe with new information and or data.

8. The computer method and software modules of claim 7 wherein said computer method and software modules are limited to download, search, display, and print food recipes.

* * * * *